April 28, 1959  H. F. JURGELEIT  2,883,704
TRANSFER MOLDING APPARATUS
Filed May 28, 1953  2 Sheets-Sheet 1
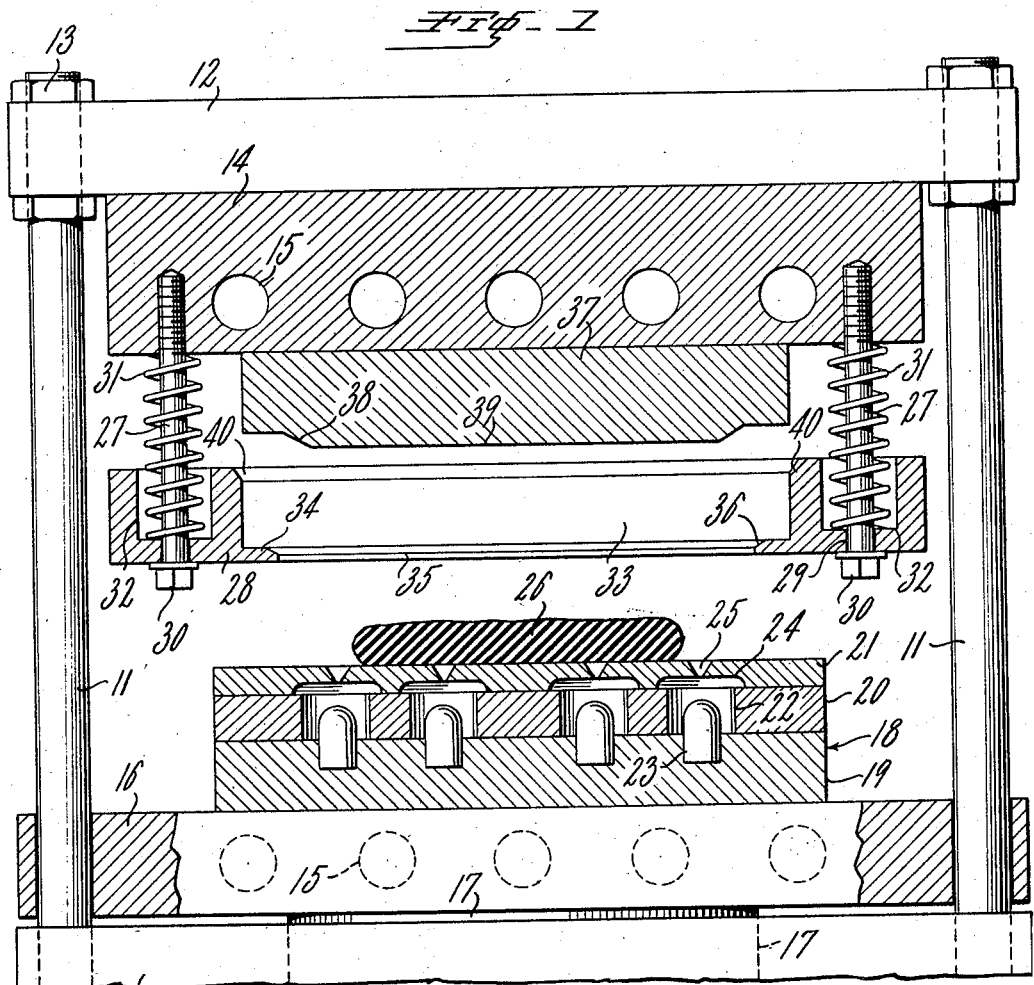
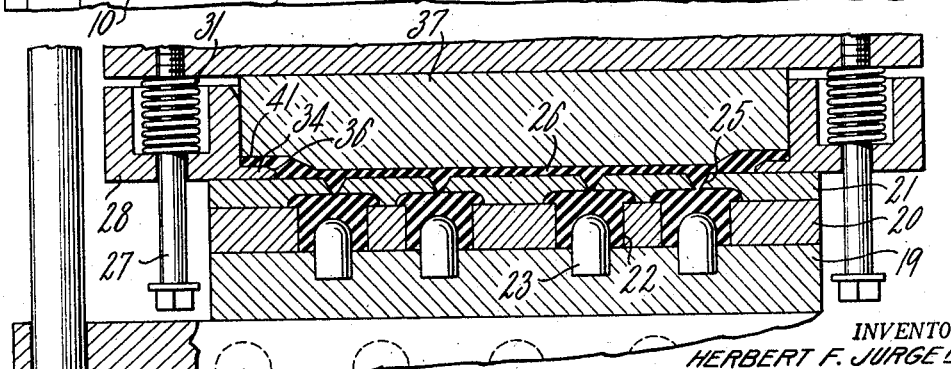
INVENTOR.
HERBERT F. JURGELEIT
BY
Henry P. Truesdell
ATTORNEY April 28, 1959 H. F. JURGELEIT 2,883,704
TRANSFER MOLDING APPARATUS
Filed May 28, 1953 2 Sheets-Sheet 2
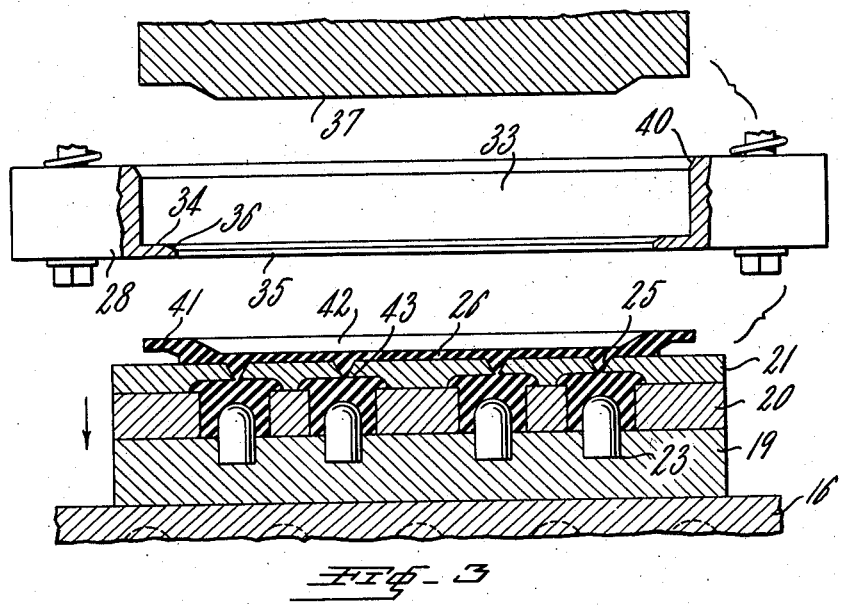
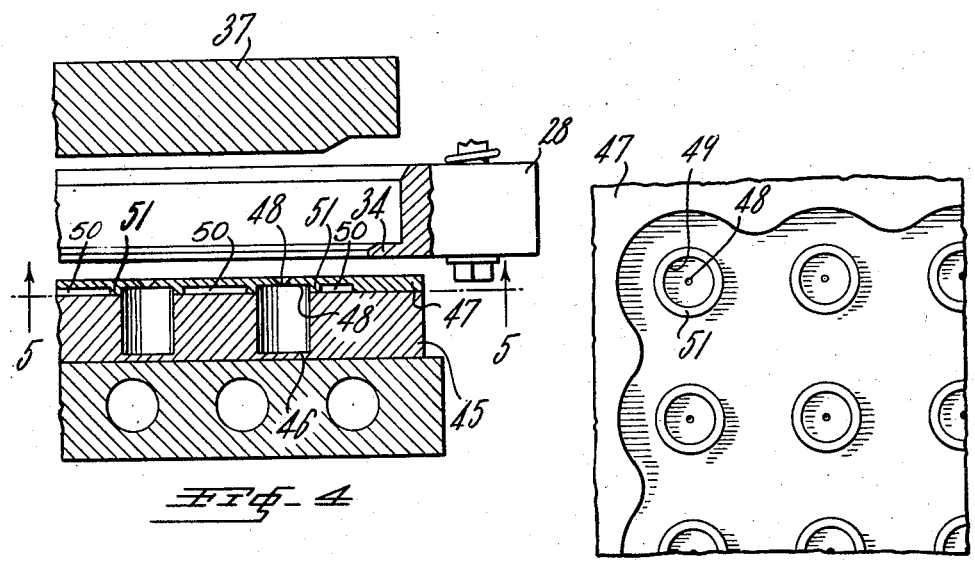
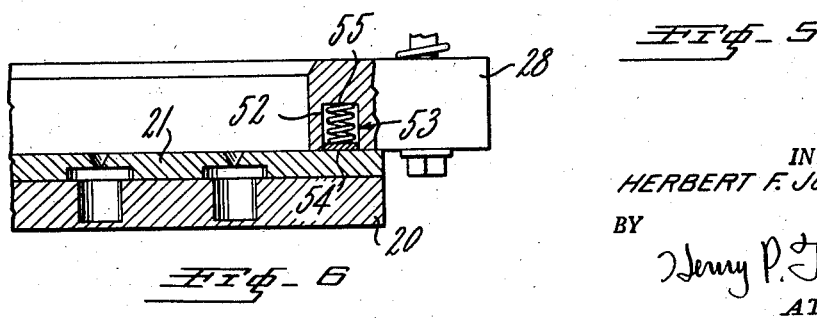
INVENTOR.
HERBERT F. JURGELEIT
BY
Henry P. Truesdell
ATTORNEY

United States Patent Office 2,883,704
Patented Apr. 28, 1959

2,883,704

TRANSFER MOLDING APPARATUS

Herbert F. Jurgeleit, Oceanside, N.Y., assignor to United States Rubber Company, New York, N.Y., a corporation of New Jersey Application May 28, 1953, Serial No. 357,987

1 Claim. (Cl. 18—17)

My invention relates to molding apparatus and more particularly to apparatus for injection molding a plurality of parts simultaneously on a conventional press used for compression molding.

Heretofore, injection molding of parts has been accomplished on a compression molding press by incorporating a cylinder in the upper part of the mold and forcing moldable material through sprue openings in the bottom wall of the cylinder into the mold by means of a plunger mating with the cylinder. Such an arrangement is illustrated by Letters Patent No. 1,919,534 issued to L. E. Shaw on July 25, 1933. However, the construction requires special designs of sprue openings and cylinder diameters for each different mold when the number, size or arrangement of the molded parts are varied. My invention overcomes the aforementioned difficulty by providing a cylinder and piston construction so designed and arranged as to be useful with a wide variety of different size molds and mold constructions provided with the necessary sprue openings.

Therefore, it is an object of my invention to provide new and improved injection molding apparatus for use on injection or compression press and with which molds of different sizes and constructions can be used interchangeably.

Another object of my invention is to provide apparatus including a cylinder and piston assembly for injection molding of material which cooperate with a mold construction having the sprues or filling slots incorporated therein for filling the mold cavities.

A further object of my invention is the provision of a new injection mold construction in which the sprues are incorporated in a separate cover plate which cooperates with the injection molding mechanism.

Still another object of my invention is the provision of a new and improved arrangement for injection molding of rubber, or similar compounds, and which may be easily applied to conventional compression or injection presses without expensive modification thereof.

In the accompanying drawing, Fig. 1 illustrates molding apparatus constructed in accordance with my invention showing the moldable material in position for extrusion into the several cavities of a mold mounted on the apparatus;

Fig. 2 illustrates the position of the molding apparatus after extrusion of the material into the mold cavities;

Fig. 3 shows the injection molding apparatus in separated position with the flash of moldable material ready for stripping;

Fig. 4 shows the injection molding apparatus being used with my improved two-part cavity mold;

Fig. 5 is a view taken along the line 5—5 of Fig. 4 and illustrates the details of construction of the sprue plate of the mold; and Fig. 6 shows a modified form of sealing means between the mold and the injection apparatus.

Fig. 1 of the drawing illustrates part of a conventional press, of the type used in compression molding, and which includes a base 10 provided with a plurality of uprights or guide rods 11 which carry a cross head 12 fastened to the guide rods by means of nuts 13. Cross head 12 carries an upper platen 14 provided with a plurality of steam channels 15 for heating the molding apparatus and mold during operation of the press. Electrical heating means may be substituted if desired, or any other suitable heating means may be used. A lower platen 16, likewise provided with a plurality of steam channels 15, is mounted for sliding movement up and down on the guide rods 11 and is moved toward the upper platen 14 by means of a ram 17 operated by fluid pressure.

One form of mold construction 18 designated particularly for use with my invention is illustrated by Fig. 1. It rests on the lower platen 16. It is illustrated by a three-part construction and comprises a bottom plate 19, a cavity plate 20, and a sprue plate 21. The cavity plate 20 is provided with a plurality of cavities 22, the number of cavities formed in the mold depending upon the area of the mold and the capacity of the press. Mold inserts 23 are carried by the bottom plate 19 and extend into the mold cavities. It will be understood that the shape of the mold cavities, and the use of the mold inserts, will depend upon the shape and construction of the article being molded. The mold shown is used to mold bottle stoppers. Part of the mold cavity is formed in the sprue plate 21, as indicated at 24, and a sprue 25 extends from the upper face of plate 21 to each cavity 24 to feed moldable material into the cavity. In use of the mold, a biscuit of moldable material 26, such as natural or synthetic rubber, or other synthetic elastomer, is placed on top of the sprue plate 21 and is formed through the sprues into the mold cavities by a mechanism now to be described.

A plurality of bolts or supporting guide rods 27 are threaded into the upper platen 14. A member 28 in the form of a flat plate of substantial thickness is carried by the bolts 27 which extend through openings 29 in the member. In normal position the member 28 rests against the enlarged heads 30 of the bolts 27 and is spaced from the upper platen 14. However, the member is free to slide on the bolts 27 for movement toward and away from the upper platen; it is held in extended position by compression springs 31 surrounding the bolts 27 and which are seated in recesses 32 in the member. The springs bias the member 28 away from the upper platen 14 and the parts carried by it.

The floating member or plate 28 is provided with an opening 33 which extends completely through the member from the upper to the lower edge. In the construction illustrated by Fig. 1 the opening is in the form of a cylinder but manifestly other polygonal shapes may be used. At the bottom edge of the member 28 a flange 34 is formed which extends inwardly from the wall of the opening 33 so that the inner wall 35 of the flange is of smaller diameter than the cylinder of opening 33. The flange 34 is formed with a beveled edge 36 which cooperates with the moldable material and a piston 37 in a manner to be described later.

The piston 37 is carried by the upper platen 14 and is fastened thereto in any suitable manner as by welding. It is of a size and configuration to mate with the opening in the member 28 so that the piston may slide within the cylinder formed by opening 33 to compress the moldable material. A beveled face 38 on the lower end of the piston forms an extending portion 39 which is of smaller diameter than the main body of the piston and which extends into the smaller opening formed by the flange 34. In order to guide the piston into engagement with the opening 33 the wall of the opening is formed with a beveled face 40 which serves to locate the member 28 centrally of the piston when the parts are moved together.

In operation of the apparatus, the assembled mold 18 is placed on the lower platen 16 and the biscuit of moldable material 26 placed on top of the sprue plate 21. The hydraulic press is now operated to raise the lower platen 16 toward the upper platen by means of the ram 17. As the platens move closer together the member 28 will first engage the upper face of the sprue plate 21 and will be moved toward the upper platen, against the action of the springs 31 upon continued upward movement of the lower platen. The compressive forces exerted by the springs seat the member 28 firmly against the upper face of the sprue plate to provide an initial contact or seal between these two elements. Further upward movement of the lower platen moves both the mold 18 and the member 28 toward the upper platen so that the piston 37 fits into the cylinder or opening 33 in the member 28. At this point the biscuit 26 of moldable material has been moved through the narrower opening formed by the flange 34 so that it is located within the confines of the opening 33 and is engaged by the piston 37.

As the piston starts to compress the moldable material against the upper face of the sprue plate 21 the material flows sideways into engagement with the flange 34 formed at the bottom of the opening. Due to the action of the beveled face 36 on the flange the moldable material flows upwardly over the face of the flange and spreads outwardly into engagement with the wall of the opening 33, as indicated in Fig. 2. In this way the moldable material itself acts to form a seal between the flange 34 and the upper face of the sprue plate 21 so that small streams of the material, known as flash, are not forced between the underside of flange 34 and the top side sprue plate 21. Upon further closing of the press elements the moldable material is forced downwardly through the sprues 25 into the mold cavities.

The press is left in closed position until the moldable material is cured after which the parts are separated by downward movement of the ram 17 and lower platen 16 so that the parts take the position indicated by Fig. 3. As the mold moves downwardly that portion of the moldable material 26 which extended over the flange 34, as indicated at 41 in Fig. 3, snaps over the flange to permit easy separation of the parts leaving the remaining flash portion 42 of the moldable material on the upper face of the sprue plate 21. The flash 42 is easily stripped from the face of the sprue plate and is readily separated from the plurality of molded articles at the bottoms of the sprues, as indicated at 43. One advantage of the arrangement is that all of the flash is formed on the top of the sprue plate and may be easily removed in one operation resulting in substantially flashless molded parts. For the purposes of illustration, the amount of flash of the moldable material left on top of the sprue plates has been exaggerated in Figs. 2 and 3; in actual practice the amount of flash remaining is very small and this may be readily stripped from the faces of the sprue plate and the molded parts.

The molding apparatus of my invention including the movable member 28, piston 37 and sprue plate 21 has several advantages. The diameter and capacity of the piston and cylinder formed by the opening 33 are designed in accordance with the rating of the press on which the parts are mounted and the thrust available from the hydraulic ram 17 to give any chosen molding pressure. Once these parts are designed for the capacity of the press, many different types of mold constructions having wide variations in the number, spacing and configuration of the molded cavities may be used with the same piston and cylinder methods. It is not necessary to provide a separately designed piston and cylinder for each different mold construction with corresponding limitations upon the number of mold cavities and the locations of the sprues. The upper face of the sprue plate 21, forming part of the mold construction, serves to form the bottom of the cylinder formed by the opening 33 so that the moldable material 26 is confined to be forced into the sprues and mold cavities. Any arrangement and design of cavities and sprues may be used as long as the sprues are located within an area within the confines of the narrower opening formed by the flange 34.

Although the flange 34 has been illustrated as being formed integrally with the metal member 28 it should be manifest that it may be formed as a separate element mounted on the member. It has a certain amount of flexibility which permits it to flex under the mold pressures closely to engage the upper surface of the sprue plate 21 to form a tight seal therewith. This tight seal, together with the fact that a part of the moldable material flows over the face of the flange prevents any of the moldable material from being ejected between the flange 34 and the sprue plate 21 as flash.

Fig. 4 illustrates a different mold construction designed particularly for use with the molding apparatus in which the bottom plate 45 of the mold is provided with a plurality of cavities 46 the cavities being closed by a sprue plate 47. The upper face of the sprue plate is provided with a plurality of sprues 48 for feeding moldable material to the cavities. The lower face of the sprue plate, as best shown by Fig. 5, is provided with a plurality of cavities 49 which, when the sprue plate is mounted in position on the bottom plate, form extensions of the cavities 46, as indicated by Fig. 4. The lower face of the sprue plate is machined out around each of the cavities 49, as indicated at 50, to provide a plurality of raised portions or lands 51 surrounding each recess 49. When the sprue plate is mounted in position on the bottom plate the land portions 51 engage the upper face of the bottom plate 45 at points immediately adjacent the cavities in the mold to form tight seals between the sprue plate and the bottom plate. This prevents any flash of the moldable material in the cavity 46 from being extruded between the sprue plate and the bottom plate and makes it possible to construct the mold cavity in two or more parts. In this connection it should be noted that when the sprue plate is removed from the mold assembly portions of the molded articles will extend above the face of the bottom plate 45 so that they may be gripped to strip them from the cavities.

Another advantage of machining out the inner face of the sprue plate to form the lands 51 is that the sprue plate acts, in effect, as a diaphragm when load is applied to it by compression of the moldable material resting on top of the plate. The diaphragm action of the sprue plate permits slight flexing of the plate. The result is that the various lands on the sprue plate may me moved into tight sealing engagement with the bottom plate over the entire area of the sprue plate thereby taking up any unevenness in the upper face of the bottom plate 45 to prevent the formation of flash between the plates.

It will be seen that the mold construction of Fig. 1, and the mold construction of Fig. 4 incorporating the diaphragm acting sprue plate, are particularly adapted for use with the injection molding apparatus of my invention. From one viewpoint the sprue plate may be said to form the bottom wall of the cylinder opening 33 and which withstands the molding pressures developed by the piston. In other words, the total molding pressure developed by the piston is applied over the entire exposed area of the sprue plate to force the plate into close seated engagement with the remaining parts of the mold. This prevents the formation of flash at the joints in the mold cavities.

In forming the seal between the floating member 28 and the top face of the sprue plate, the flange 34 has the advantage that it is formed integrally with the member and is not subject to any wear or deterioration in service. However, the joint between the member 28 and the upper face of the sprue plate may be sealed by other means. As illustrated in Fig. 6, the member 28 is provided with a recess 52 in which is seated a gasket 53 having a metal face 54 of lead, copper or the like for engaging the upper face of the sprue plate 21. A backing member such as a spring 55 forces the metal face against the sprue plate.

My invention is one which may be readily incorporated into existing compression or injection presses simply by fitting the upper platen with the cylinder member 28 and the piston 37. It may be used with a wide variety of different mold constructions.

Having thus described my invention, what I claim and desire to protect by Letters Patent is:

Molding apparatus comprising separable first and second units that are disposed one against the other, said units defining a plurality of cavities, at least a portion of each cavity being within the peripheral confines of said first unit, said second unit having a plurality of sprues therethrough for feeding moldable material into corresponding cavities, a hollow member open at at least one end and defining a chamber in which said moldable material can be confined, said open end of said hollow member being disposed against a surface of said second unit and encompassing an area co-extensive with said sprues whereby said chamber is interconnected by said sprues with all of said cavities, a piston in said chamber and means for effecting relative movement between said hollow member and said piston to force said moldable material in said chamber through said sprues into said cavities and to simultaneously apply pressure through said moldable material to said surface of said second unit, each portion of said second unit covering any one of said cavities being locally deflectable relative to any other portion of said second unit covering any other cavity by the pressure of said moldable material acting on the outer surface of said covering portions so that each of said covering portions may be moved substantially independently by the pressure of said moldable material to take up unevenness between mating surfaces of said units and provide tight sealing engagement between mating surfaces surrounding each cavity to thereby eliminate the formation of flash between said mating surfaces.

References Cited in the file of this patent

UNITED STATES PATENTS

| | | |
|---|---|---|
| 1,919,534 | Shaw | July 25, 1933 |
| 2,072,349 | Wayne | Mar. 2, 1937 |
| 2,163,177 | Novotny | June 20, 1939 |
| 2,241,180 | Burke | May 6, 1941 |
| 2,395,316 | Brunner | Feb. 19, 1946 |
| 2,585,204 | Wondra | Feb. 12, 1952 |
| 2,592,296 | Kutik | Apr. 8, 1952 |

FOREIGN PATENTS

| | | |
|---|---|---|
| 648,506 | France | Aug. 14, 1928 |
| 624,903 | Great Britain | June 17, 1949 |
| 633,793 | Great Britain | Dec. 30, 1949 |